(12) United States Patent
Siskind et al.

(10) Patent No.: US 11,002,555 B2
(45) Date of Patent: May 11, 2021

(54) GENERATING SAFE ROUTES FOR TRAFFIC USING CRIME-RELATED INFORMATION

(71) Applicants: Cory Rebecca Siskind, Cambridge, MA (US); Edwin Nicholas Gomez Cuellar, Cambridge, MA (US)

(72) Inventors: Cory Rebecca Siskind, Cambridge, MA (US); Edwin Nicholas Gomez Cuellar, Cambridge, MA (US)

(73) Assignee: BASE OPERATIONS INC., Washington, DC (US)

( * ) Notice: Subject to any disclaimer, the term of this patent is extended or adjusted under 35 U.S.C. 154(b) by 2 days.

(21) Appl. No.: 15/887,924

(22) Filed: Feb. 2, 2018

(65) Prior Publication Data
US 2019/0242718 A1    Aug. 8, 2019

(51) Int. Cl.
*G01C 21/34*    (2006.01)
*G06N 5/02*    (2006.01)
*G06N 5/04*    (2006.01)
*G01C 21/36*    (2006.01)

(52) U.S. Cl.
CPC ..... *G01C 21/3461* (2013.01); *G01C 21/3676* (2013.01); *G01C 21/3694* (2013.01)

(58) Field of Classification Search
None
See application file for complete search history.

(56) References Cited

U.S. PATENT DOCUMENTS

| 8,090,532 | B2 | 1/2012 | Tashev et al. | |
| 8,762,035 | B2* | 6/2014 | Levine | G01C 21/3492 |
| | | | | 701/117 |
| 9,927,252 | B1* | 3/2018 | Chokshi | G01C 21/3461 |
| 2011/0111728 | A1* | 5/2011 | Ferguson | H04W 76/50 |
| | | | | 455/404.2 |
| 2016/0189043 | A1* | 6/2016 | Mcgeever | G06N 5/04 |
| | | | | 706/46 |

OTHER PUBLICATIONS

"Get the Best Route, Every Day, With Real-Time Help From Other Drivers", Retrieved from https://www.waze.com/, Retrieved on: Jun. 29, 2018, 3 Pages.
(Continued)

*Primary Examiner* — Adam D Tissot
*Assistant Examiner* — Laura E Linhardt

(57) ABSTRACT

Methods, systems, and computer storage media for generating a visual representation of crime-related information on a map are provided. The crime-related information is gathered from a variety of sources and evaluated to ensure there is no bias when generating metrics that describe individual events within the information. The evaluation involves normalization of a crime's location (e.g., longitude and latitude) and statistical analysis of a crime's severity (e.g., vandalism vs. car theft). Once the metrics are derived, they are employed to generate map that plots the individual events in a visually intuitive manner, such as heat map. In one instance, the map is used to route travelers to their destination optimizing for the safest route, while also considering timing of the trip. In another instance, the map is used to alert a user when s/he enters into an area with event(s) designated as having severe criminal events.

7 Claims, 11 Drawing Sheets

(56) References Cited

OTHER PUBLICATIONS

"Nextdoor—The Private Social Network For Your Neighborhood", Retrieved from https://nextdoor.com/, Retrieved on: Jun. 29, 2018, 4 Pages.

"The On-Call Mobile Security App that always has your back", Retrieved from https://companionapp.io, Retrieved on: Jun. 29, 2018, 4 Pages.

Whitwam, Ryan, "Google Maps Adds Real Time Incident Reporting Courtesy Of Waze", Retrieved from https://www.androidpolice.com/2013/08/20/google-maps-adds-real-time-incident-reporting-courtesy-of-waze/, Aug. 20, 2013, 4 Pages.

\* cited by examiner

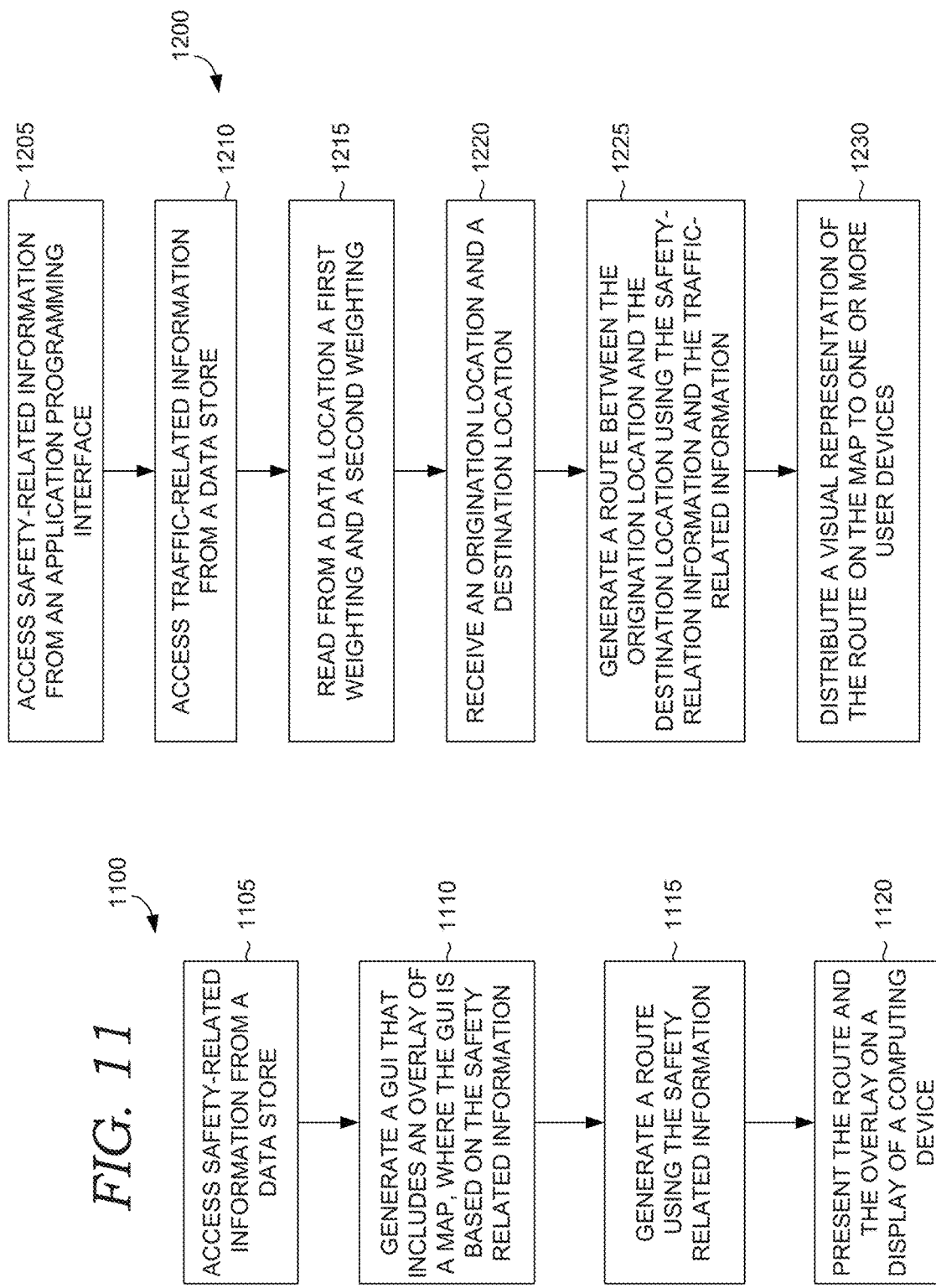

GENERATING SAFE ROUTES FOR TRAFFIC USING CRIME-RELATED INFORMATION

BACKGROUND

With the proliferation of computing devices that can travel with a user (e.g., mobile phones, intelligent dashboards, smart wearables, and other mobile devices), there is an opportunity to provide the user with route-planning applications. Some of these applications are utilized to aid users in locating points of interest, such as particular buildings, addresses, and the like. Additionally, in several existent commercial applications, users can vary a zoom level of a map, thereby enabling variation of context and detail as the zoom level is altered.

Furthermore, conventional computer-implemented mapping applications may include automotive route-planning that provides users with directions between different locations. For example, the user can provide an automotive route-planning application with a beginning point of travel and an end point of travel (e.g., beginning and ending addresses). The route-planning application can utilize representations of roads and intersections to output a suggested route of travel. The exact route of travel may depend upon user-selected parameters, such as a commercial route-planning selection that enables a user to specify that s/he wishes to avoid highways. Similarly, a user can inform the route-planning application that s/he wishes to travel on a shortest distance route or on a route that takes a least amount of time.

Since inception of these route-planning applications, individuals have grown to rely increasingly on them to aid them in everything from locating a friend's house to planning cross-country road trips. But, although some aspects of the trip or location search may be modified by a user (e.g., travel time vs. travel distance), there are other consideration that might be important to the user when determining how to navigate between two locations. Accordingly, there is a need to understand more about the environment of a user beyond simply the routes available.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention introduce computer systems, computerized methods, and computer storage media for providing a visual view of crime-related information on a map (e.g., a heat map with varied levels of intensity) or an overlay that may be applied to one or more different types of maps (e.g., a navigation-based map that shows the routes for reaching a destination).

Many communities have serious problems with safety, such as muggings, personal injury, and theft. When not reported, residents and/or visitors are unaware of the safety issues. If made aware, residents and/or visitors could better protect themselves and avoid or be better prepared in dangerous areas. According, one goal of the present invention is to alert residents and/or visitors of a particular area (e.g., city, region, and street location) of safety issues during a commute home, an evening out, and/or when choosing a place to live, work, go to school.

As mentioned above, there exists no accurate, comprehensive source of data that can reliably help a person navigate away from dangerous area while traveling through a city, for example. This is especially true of areas with frequent safety issues, as the local community or government may not advertise them (e.g., allowing them to go under-reported). Accordingly, another goal of the present invention is to access many sources of safety-related data, normalize the data, and provide people information about areas that have historical and/or ongoing safety issues. Thus, residents and/or visitors will be enabled to make decisions with regard to this safety-related information.

Generally, the present invention may be deployed as an application, distributed software (e.g., service running with a server in the cloud and a client on the mobile device), logic running on a processor, or other media-on-processor implementation that collects, processes, and presents safety-related information (i.e., crime incidents, civil disturbances, any type of criminal event, alarming occurrences, and other ongoing that would cause harm or fear) to help users of the deployment make decisions based on dangerous areas. In one example, the invention may be implemented as an app running on a mobile device that is supported by one or more computing configurations (e.g., distributed cloud-computing environment, server(s) hosting VM(s), computing devices connected over a network, one or more processors, and the like). The app may surface a map, similar to Waze®, but focusing on safety as opposed to finding the fasted route. The exemplary app described herein is configured not only to surface a map of safety-related data in a graphical representation, but to allow users and community members to add information whenever they become aware of any crime, concerns, safety issues, and other danger(s). Other users and community members are enabled by the app to verify or dispute the danger(s), and/or comment on whether the danger has passed.

In operation, an app implementation of the present invention could take many forms, for the purpose of assisting a variety of different people in a variety of different contexts. These forms include a commercial app, an enterprise app, and an integration with another piece of software. The commercial app may be run on a user's mobile device with access to a data store and processing mechanism(s) residing on a cloud server. The public app might allow visitors to a new city and those moving to a new city a source of dangerous areas when traveling and purchasing a home, respectively. The private app may be run on a corporate device (e g administrator's console) and/or an employee's personal device (e.g., handset) with access to a data store and processing mechanism(s) residing on a cloud privately managed by an enterprise. The private app might allow employees of the enterprise traveling to remote or international cities (e.g., ex-pats working abroad) access to a dedicated security team and local crime-related information in real-time occurring at the foreign location. This crime-related information may be assistive in providing routes to an office with consideration of security issues.

Another exemplary implementation of the present invention is an overlay that plots safety-related data and indicates a sensitivity level (described in detail below) of that data. As used herein, the term "overlay" is not meant to be limiting but, may include any format of data that includes a location and corresponding a sensitivity level of a dangerous incident that has occurred in specific timeframe. Thus, overlay may include, among other formats, a spreadsheet that lists the data or a graphical representation of the plots in a user-intuitive representation. In operation, the overlay may be accessed from an application programming interface (API) of a cloud-computing infrastructure and integrated with another mapping application, such as Waze®, to increase security of the determined routing based on user-specified controls (e.g., safe but decently fast). Specifically, the integration of the overlay with an internal or separate $3^{rd}$-party (external) mapping application allows users the option to select between the fastest and safest route, or some balance therebetween. That is, an embodiment of the invention involves providing controls and supporting logic for varying a routing determination using security-parameter-based navigation and adjusting for sensitivity of the user's tolerance for unsafe areas. In one instance, a control setting of high sensitivity for unsafe areas may create a route that avoided all locations with crime-related data plotted thereon. Meanwhile, a medium setting may generate a route that was likely faster, but through a low-concentration of crime areas.

In embodiments, the crime-related information being accessed via the API is stored in a cloud-computing infrastructure on one or more nodes. The processing of this information may be conducted by a service application with tenancy in the cloud, and may be distributed among various nodes or virtual machines. These nodes may be copied for the purpose of data-center migration, updates, or failures. As used herein, "nodes" represent physical hosts (e.g., computing devices) capable of running tenants of a customer's service application within the cloud-computing infrastructure, a data center, a distributed computing platform, or any other networked system. As used herein, the term "tenants" broadly refers to instances of one or more roles of a service application. These "instances" typically represent copies or replications of at least one role, which resembles a component program, for supporting particular functional aspects of the service application.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates substantially similar or identical items.

FIG. 11 is a flow diagram showing an overall method for using safety-related data to identify a secure route between two points, in accordance with an embodiment of the present invention; and FIG. 12 is a flow diagram showing an overall method for using safety-related information and traffic-related information to generate a route on a map, in accordance with an embodiment of the present invention.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Exemplary Operating Environment

Figure 1:
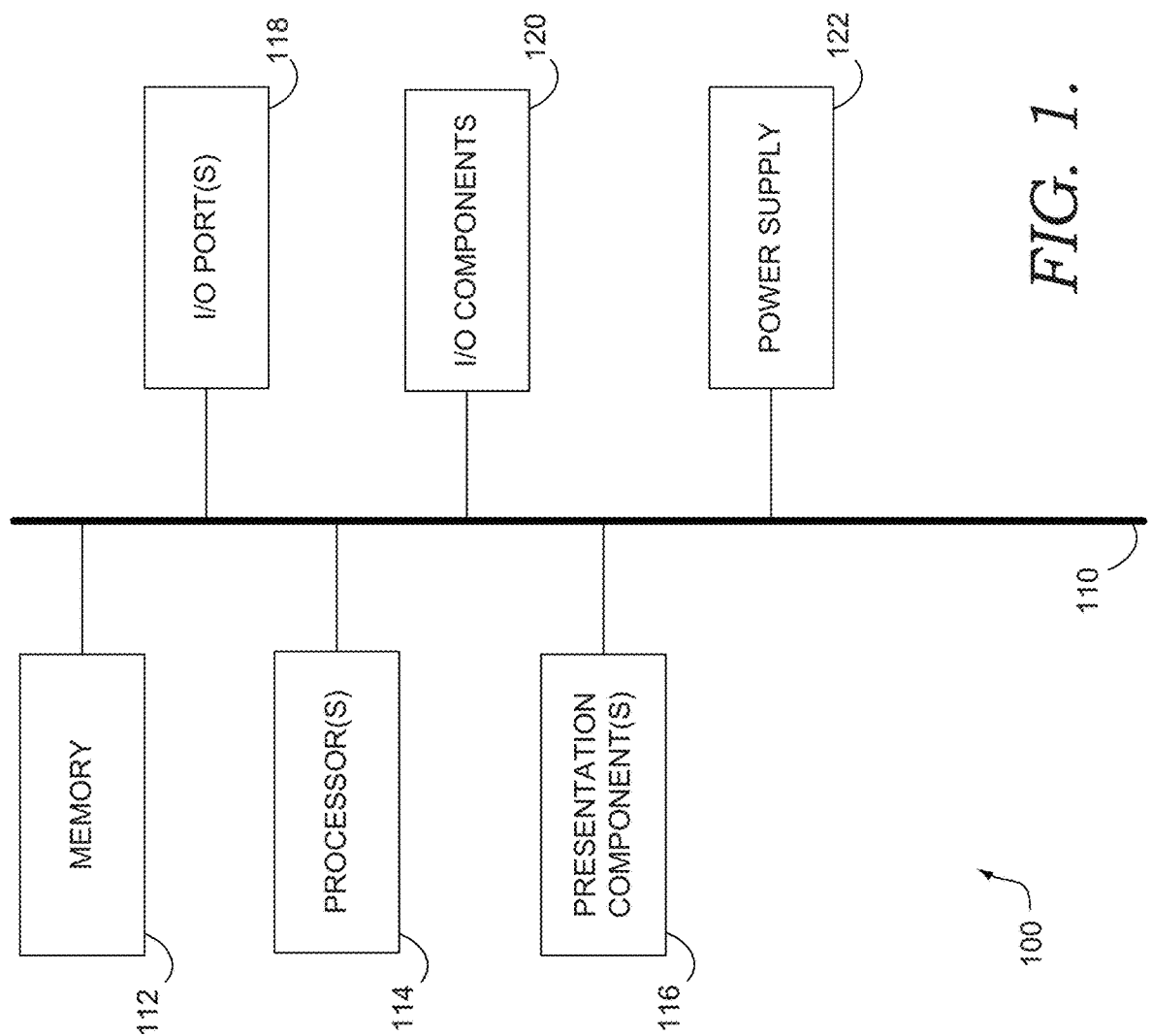
FIG. 1 is a block diagram of an exemplary computing environment suitable for use in implementing embodiments of the present invention.

Referring to the drawings in general, and initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The invention may be practiced in a variety of system configurations, including hand-held devices, consumer electronics, general-purpose computers, specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device.

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media.

Computer storage media includes volatile and non-volatile, removable and non-removable media implemented in any method or technology for storage of information such as computer readable instructions, data structures, program modules, or other data. Computer storage media include, hut are not limited to, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media typically embody computer-readable instructions, data structures, program modules, or other data in a modulated data signal, such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RE, infrared, and other wireless media. Combinations of any of the above should also be included within the scope of computer-readable media; however, as defined herein, computer storage media does not include communication media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Memory 112 stores, among other data, one or more applications. The applications, when executed by the one or more processors, operate to perform functionality on the computing device. The applications may communicate with counterpart applications or services such as web services accessible via a network (not shown). For example, the applications may represent downloaded client-side applications that correspond to server-side services executing in a cloud. In some examples, aspects of the disclosure may distribute an application across a computing system, with server-side services executing in a cloud based on input and/or interaction received at client-side instances of the application. In other examples, application instances may be configured to communicate with data sources and other comp t ng resources in a cloud during runtime, such as communicating with a cluster manager or health manager during a monitored upgrade, or may share and/or aggregate data between client-side services and cloud services.

Presentation component(s) 116 present data indications to a user or other device. Exemplary presentation components include a display device, speaker, printing component, vibrating component, etc.

Ports 118 allow computing device 100 to be logically coupled to other devices including I/O components 120, some of which may be built in. Illustrative components include a microphone, joystick, game pad, satellite dish, scanner, printer, wireless device, etc.

Architecture of Exemplary Cloud-Computing Infrastructures

Figure 2:
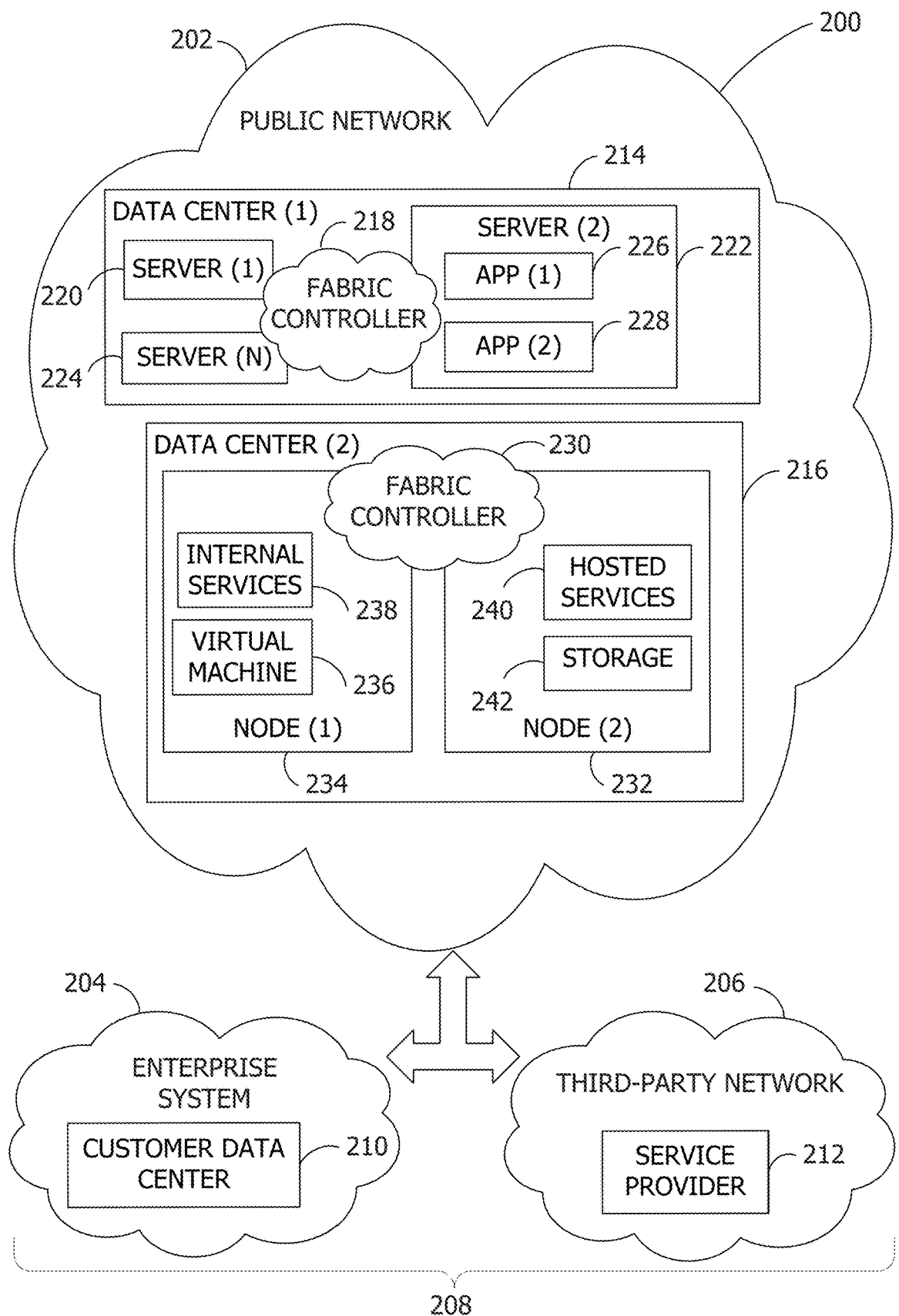
FIG. 2 is a block diagram illustrating an architecture of an exemplary cloud-computing infrastructure, suitable for use in implementing embodiments of the present invention.

Turning now to FIG. 2, an exemplary block diagram illustrates a cloud-computing environment for monitoring the health of an application during an upgrade. Architecture 200 illustrates an exemplary cloud-computing infrastructure, suitable for use in implementing aspects of the disclosure. Architecture 200 should not be interpreted as having any dependency or requirement related to any single component or combination of components illustrated therein. In addition, any number of nodes, virtual machines, data centers, role instances, or combinations thereof may be employed to achieve the desired functionality within the scope of embodiments of the present disclosure.

The distributed computing environment of FIG. 2 includes a public network 202, an enterprise system 204, and a third-party network 206. Public network 202 may be a public cloud, for example. Enterprise system 204 may be a private enterprise network or private cloud, while the third-party network 206 may be a third party network or dedicated cloud. In this example, enterprise system 204 may host a customer data center 210, and third-party network 206 may host an internet service provider 212. Hybrid cloud 208 may include any combination of public network 202, enterprise system 204, and third-party network 206. For example, third-party network 206 may be optional, with hybrid cloud 208 comprised of public network 202 and enterprise system 204.

Public network 202 may include data centers configured to host and support operations, including tasks of a distributed application, according to the fabric controller 218 it will be understood and appreciated that data center 214 and data center 216 shown in FIG. 2 is merely an example of one suitable implementation for accommodating one or more distributed applications and is not intended to suggest any limitation as to the scope of use or functionality of embodiments of the present disclosure. Neither should data center 214 and data center 216 be interpreted as having any dependency or requirement related to any single resource, combination of resources, combination of servers (e.g. server 220, server 222, and server 224) combination of nodes (e.g., nodes 232 and 234), or set of APIs to access the resources, servers, and/or nodes.

Data center 214 illustrates a data center comprising a plurality of servers, such as server 220, server 222, and server 224. A fabric controller 218 is responsible for automatically managing the servers and distributing tasks and other resources within the data center 214. By way of example, the fabric controller 218 may rely on a service model (e.g., designed by a customer that owns the distributed application) to provide guidance on how, where, and when to configure server 222 and how, where, and when to place application 226 and application 228 thereon. In one embodiment, one or more role instances of a distributed application, may be placed on one or more of the servers of data center 214, where the one or more role instances may represent the portions of software, component programs, or instances of roles that participate in the distributed application. In another embodiment, one or more of the role instances may represent stored data that is accessible to the distributed application.

Data center 16 illustrates a data center comprising a plurality of nodes, such as node 232 and node 234. One or more virtual machines may run on nodes of data center 216, such as virtual machine 236 of node 234 for example. Although FIG. 2 depicts a single virtual node on a single node of data center 216, any number of virtual nodes may be implemented on any number of nodes of the data center in accordance with illustrative embodiments of the disclosure. Generally, virtual machine 236 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine 236 may include processing capacity, storage locations, and other assets within the data center 216 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 230 is responsible for automatically managing the virtual machines running on the nodes of data center 216 and for placing the role instances and other resources (e.g., software components) within the data center 216. By way of example, the fabric controller 230 may rely on a service model (e.g., designed by a customer that owns the service application) to provide guidance on how, where, and when to configure the virtual machines, such as virtual machine 236, and how, where, and when to place the role instances thereon.

As discussed above, the virtual machines may be dynamically established and configured within one or more nodes of a data center. As illustrated herein, node 232 and node 234 may be any form of computing devices, such as, for example, a personal computer, a desktop computer, a laptop computer, a mobile device, a consumer electronic device, server(s), the computing device 100 of FIG. 1, and the like. In one instance, the nodes host and support the operations of the virtual machines, while simultaneously hosting other virtual machines carved out for supporting other tenants of the data center 216, such as internal services 238 and hosted services 240. Often, the role instances may include endpoints of distinct service applications owned by different customers.

Typically, each of the nodes include, or is linked to, some form of a computing unit central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role instances that reside on the nodes support operation of service applications and may be interconnected via application programming interfaces (APIs). In one instance, one or more of these interconnections may be established via a network cloud, such as public network 202. The network cloud serves to interconnect resources, such as the role instances, which may be distributedly placed across various physical hosts, such as nodes 232 and 234. In addition, the network cloud facilitates communication over channels connecting the role instances of the service applications running in the data center 216. By way of example, the network cloud may include, without limitation, one or more local area networks (LANs) and/or wide area networks (WANs) Such networking environments are commonplace in offices, enterprise-wide computer networks, intranets, and the Internet. Accordingly, the network is not further described herein.

Framework of a Safe-Routing System

Figure 3:
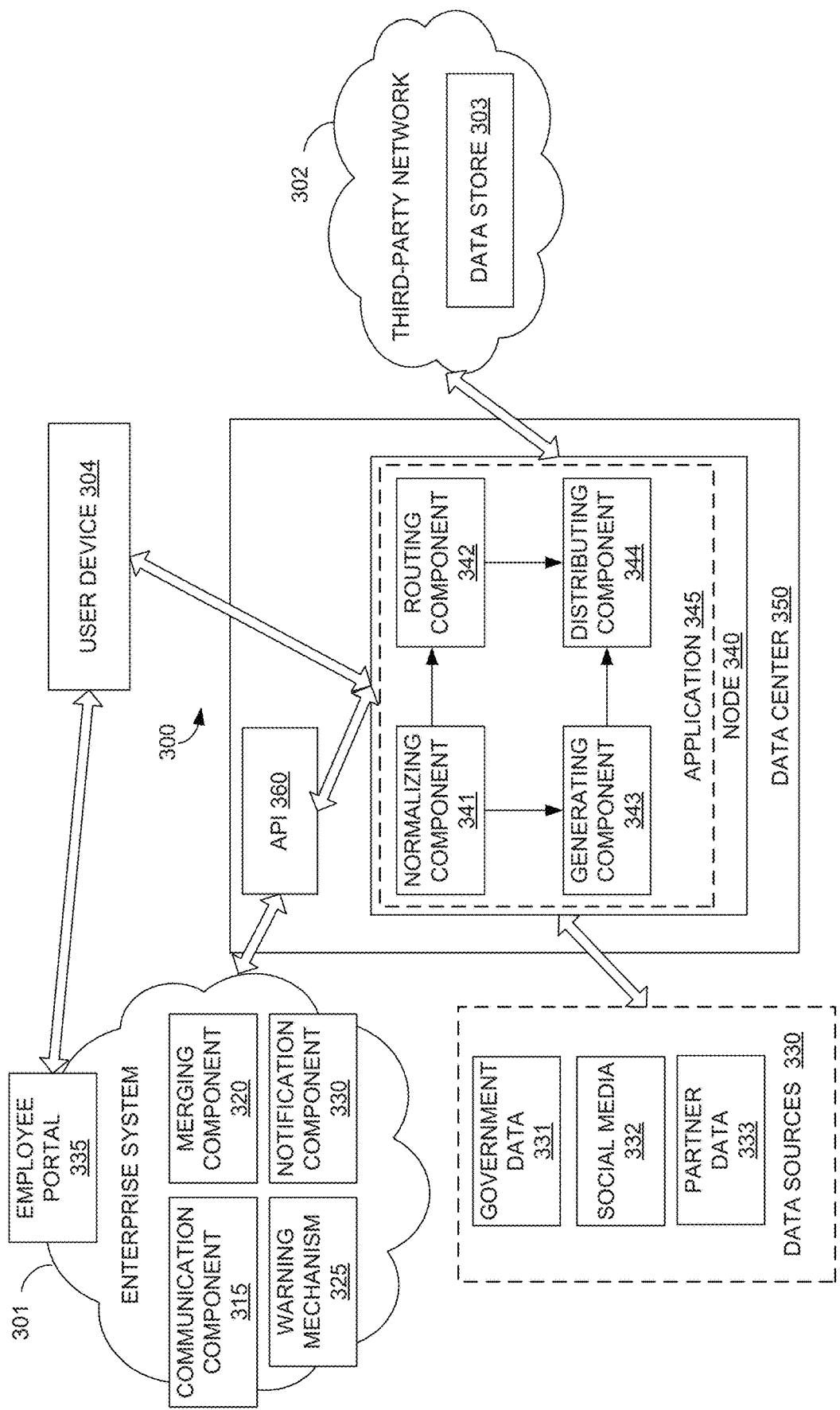
FIG. 3 is a block diagram illustrating a framework of a safe-routing system, suitable for use in implementing embodiments of the present invention.

Turning now to FIG. 3, a block diagram illustrating framework of an exemplary safe-routing system 300, suitable for use in implementing embodiments of the present invention, is shown. The system 300 includes a third-party network 302 (e.g., third-party network 206 of FIG. 2) an enterprise system 301 (e.g., enterprise system 204 of FIG. 2), data sources 330, a user device (e.g., computing device 100 of FIG. 1), and a data center 350 (e.g., data center 214 of FIG. 2) that might reside within the public network 202 of FIG. 2. The data center 350 includes at least one node, such as node 340 (e.g., node 234 of FIG. 2). The node 340 includes one or more components, such as components 341, 342, 343, and 344. The components 341, 342, 343, and 344 are communicatively connected to the data sources 330 over one or more interconnections that may be established via a network cloud (not shown). The network cloud serves to interconnect resources, which may be distributedly placed across various physical hosts. In addition, the network cloud facilitates communication over channels connecting the components 341, 342, 343, and 344 running in the data center 350. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

As illustrated in FIG. 3, the data sources 330 include government data 331, social media 332, and partner data 333. It should be noted that these data sources 330 may be maintained in different storage locations and may contain similar or different information related safety-related information. It should be noted that the phrase "safety-related information" is not meant to be limiting but may encompass all types of data that would affect the safety of an individual (e.g., crime incidents, traffic-related information, civil disturbances, political events, war-time occurrences, and other happenings that would cause fear or harm). Also, it should be understood that the sources data sources 330 are only examples of the types of sources of safety-related information that may stream data to the application 345. Other types of data sources, beyond those shown in FIG. 3, feeding to the application 345 or being accessible by the application are contemplated by embodiments of the present invention. For instance, crowd-sourced data may be provided to the normalizing component 341 of the application 345 via one or more mobile devices (e.g., user device 304).

The information is passed or mined from these various data sources 330 to a normalizing component 341 that is configured to aggregate and/or integrate the information to create a representation of an actual level of danger (e.g., paint a realistic picture of the local security situation to a user). In an exemplary embodiment, government data 331 represents information that is collected from government-run websites that offers statistics of crime and other concerns in an area. This information comprises anything a local, state or federal government has published or is required to produce, such as that required by the Freedom of information Act. For instance, the Statistical Institute of Mexico provides an online set of security data that is published for public use. Also, local municipal police publish the latitude and longitude (or street addresses) of crime data. This data may by reformatted as offered as an API for automatic delivery to the interface of an application 345. The backend of the application 345 is configured to process the flow of data to generate a heat map, for example, using a generating component 343.

Data is also mined from social media 332. This data includes information scraped from media outlets, such as Twitter®. With reference to the specific example of Twitter®, the information may involve identifying reports of crime from one or more users. Another approach to mining social media 332 is curating sources by focusing on power users that collect reports from others and tag them for purpose of re-sharing. Thus, the power users are sources that aggregate crime data on their own (e.g., news organizations or networks that are concerned with publishing safety data).

Crime-related information may be gathered from partner data 333 as well. This partner data 333 may involve sets of information provided from organizations that have partnered with the owners of the application 345 and may include universities and other non-government organizations (NGOs) that have aggregated data with a severity level and area, respectively, of danger. Beyond the data sources 330, the application 345 may employ a frontend UI (not shown) that accepts information from users directly through the user device 304. In embodiments, the user device is configured to present crime-related information to a user, receive crime-related information from the user, and accept the user's verifications of other's crime-related information.

Operation of the application 345 is supported by one or more servers within the data center 350, such as node 340. The application 345 comprises the normalizing component 341, a routing component 342, a generating component 343, and a distributing component 344. It should be appreciated and understood that operations of the application 345 may be distributed among the components 341, 342, 343, and 344 in a manner and a number of components may be used to carry out the operations of the application 345. Further, the components 341, 342, 343, and 344 may exist on only the node 340 or may be distributed among a number of nodes and/or may be replicated or divided across the data center 350 or even multiple data centers.

In embodiments, the normalizing component 341 is configured to pull or receive crime-related data flowing from many sources, such as the data sources 330 and the user device 304. Further, the normalizing component 341 is equipped to normalize the data based on at least location and on severity of the criminal activity. When normalizing the data based on location, the normalizing component is enabled to determine if the data is structured (e.g., longitude and latitude) or un-strutted (e.g., street intersection) and create common form of location. When normalizing the data based on severity of the criminal activity, the normalizing component may use a model that includes a scale for ranking or weighting crimes (e.g., a mugging in an area is weighted more than a vandalism but less than a homicide). As a result, the normalizing component 341 is able to assign a level of severity to any criminal event that is reported upon referencing the scale.

In embodiments, the normalizing component 341 is configured to evaluate and process crime-related information from the various data sources differently. For instance, when receiving government data 331, the normalizing component is able to perform statistical analysis that detects biases on the metrics being provided (e.g., car theft is overly reported for insurance purposes, but petty crime is typically underreported). Also, the normalizing component 341 may apply a confidence check to the government data 331 to verify and filter the data by applying manual expertise and institutional knowledge to ensure it appears accurate (e.g., many incidents around bus stops is likely true).

When data mining the social media 331, the normalizing component. 341 is configured to scrape a distributed network or online location and extract data points from the scraping activity. Then, in embodiments, natural language processing is used to identify the fields needed for a complete data point: longitude and latitude (or a relative location); type of crime (e.g., assault or homicide); time of day (e.g., timestamp); and date. With reference to the Twitter® example, the content of a tweet may be examined as well as the metadata of the tweet itself to derive information to create a data point. If a field is missing, the normalization component 341 will either discard the entire tweet, attempt to extract the missing information elsewhere, or populate the missing info with a best guess or default value. Once all the fields are discovered, the complete data point is added to a database (e.g., data store 303).

As mentioned above, private organizations/companies that collect their own security data (e.g., data collected is crime at and surrounding each franchise of a chain of gas stations) comprises the partner data 333. The partner data 333 may be handled slightly differently by the normalizing component 341 to ensure completeness. For example, a non-government organization (NGO) that is called before the police to provide legal consult might have its own database for collecting information. However, this information is likely skewed toward a particular set of crimes and toward a specific set of locations within a city. Here, the normalization component 341 is able to process and verify this information on case-by-case basis looking for gaps in the information. For instance, a lack of incidents for a certain area may mean either there is no crime or that there is no partner presence in that area. Based on the gaps in the information, the normalizing component 341 assigns a confidence rating for an organization providing partner data 333. The confidence rating may also depend various other factors and criteria, such as whether the partner overreports or underreports certain types of crime or the partner provides reliable data in only certain areas.

The user device 304 of FIG. 3 is equipped to provide input and receive output from the application 345. It should be noted that one, many, or all of the components 341, 342, 343, and 344 of the application may reside on the user device 304. Further, the user device 304 may be configured with a touchscreen to both present information and receive user selections (e.g., presentation components 116 of FIG. 1). In operation, the user device 304 is able to receive an input from a user when that person experiences or witnesses a crime incident. As used herein, the phrase "crime incident" is not meant to be limiting but is intended to encompass all safety-related occurrences, such as criminal activity, security-related events, and even non-criminal disturbances. The user device 304 will then report the crime incident via the frontend of the application 345 and to the normalizing component 341 for processing and storage.

Figure 6:
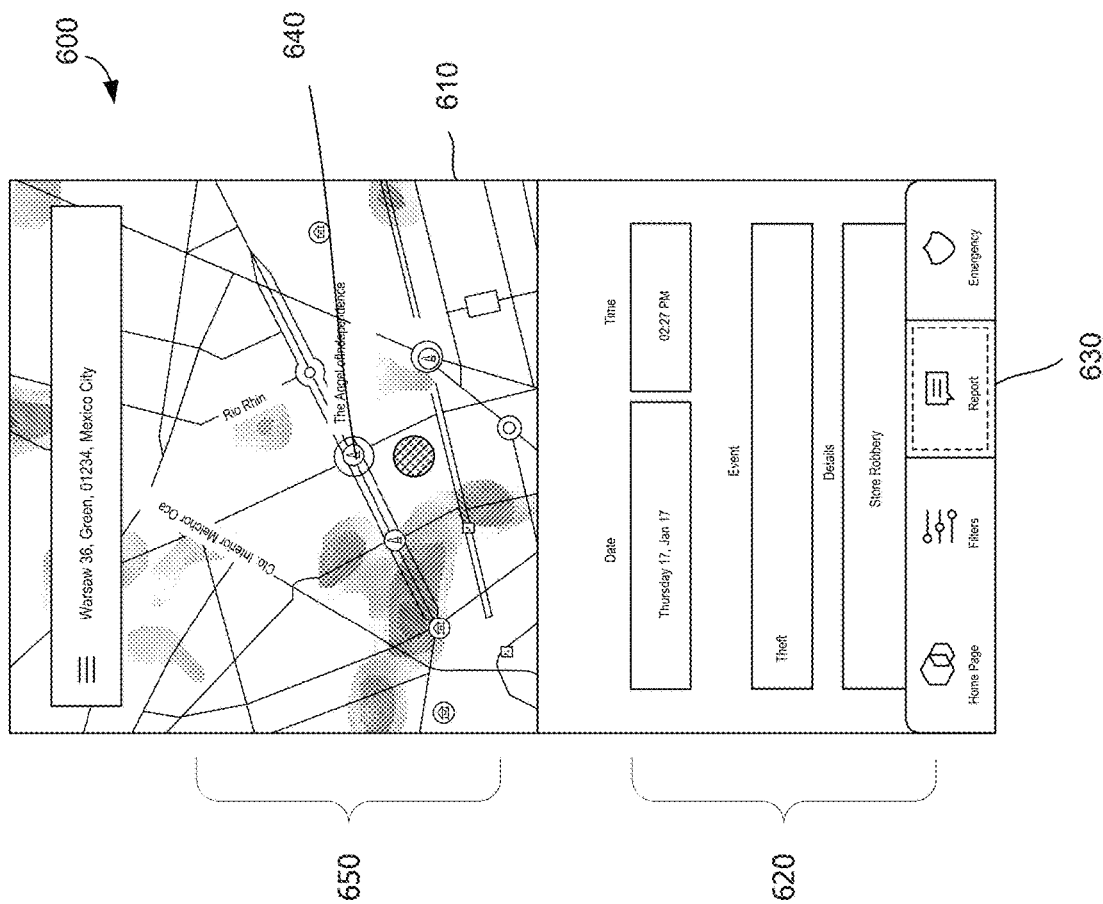
FIG. 6 is a graphical representation of an exemplary graphical user interface (GUI) for reporting crime incidents, in accordance with an embodiment of the present invention.

Turning to FIG. 6, a graphical representation 600 of an exemplary graphical user interface (GUI) 610 for reporting crime incidents is shown, in accordance with an embodiment of the present invention. A user-initiated selection at location 630 invokes the user device 304 to render the GUI 610. The GUI 610 includes at least a map with an overlay 650 that shows a plot of previously reported safety-related data and a reporting screen 620. In operation, when inputting a new crime incident, the user of the user device 304 is enabled to select a point on the map 640 and specify a time, a date, the type of crime, and provide a description of the situation using input areas within the reporting screen 620. It should be understood that the manner in which a user inputs aspects of the crime incident (e.g., time, date, event details and type, and the like) into the reporting screen 620 may include typing, selection from a menu, and any other known method of entering information into a computing device (e.g., touchscreen of the user device 304). It should be noted that the reporting screen 620, or a similar GUI for accepting information, may be rendered on the user device 304 for the purpose of verifying or disputing previously reported crime incidents. Further, because safety-related information from many data sources (e.g., data sources 330 of FIG. 3 as well as user devices of customers of the application 345) are plotted on the overlay 650, verification using the reporting screen 620 acts to verify or dispute safety-related information across the full pipeline of data being gathered by the application 345 of FIG. 3.

Turning back to FIG. 3, additional features of the normalizing component 341 of the application 345 will now be described. As mentioned above, the normalizing component 341 is configured to access and/or receive safety-related information from one more sources (e.g., data sources 330 and/or the user device 304) and process that information. Generally, processing the information involves reviewing, checking, and filtering the information to determine whether the data is accurate and valuable. When determining the accuracy of the data, the normalizing component 341 may submit the data for a manual validation that investigates the source of the data whether the user is exhibiting malicious behavior) and the content of the data (e.g., whether the data is missing certain metrics). In another instance, the normalizing component 341 may use automated heuristics to determine whether the data is accurate. Some exemplary heuristics involve the following: the user posting more than a predefined threshold (e.g., the identity of the user may be a bot if there are a significant number of posts over a set timeframe or the user is spanning to offset the actual crime incidents) and the reported data includes outliers (e.g., artificial intelligence may be used to scan the data to detect known patterns of bot postings). One exemplary method for determining whether a user is posting an unusually high amount of data is to access stored, normal, user behavior and comparing it to the inputs of a particular user. If the historical behavior of a bot matches the particular user's inputs, then the normalizing component 341 is triggered to take at least one action, such as discounting the input from that particular user. One exemplary method for determining whether the reported data includes outliers is to compare the location of the suspected outliers against previously confirmed safety-related data. If the safety-related data indicates that the suspected outlier is located in a traditionally safe area, then the suspected outlier flagged with a tracking tag and assigned a status of pending plotting on the overlay.

There are various actions that the normalizing component 341 may carry out to determine the value of the data being received from the various streams of input. In one instance, the normalizing component 341 is equipped to reduce redundancy (e.g., eliminate duplicates of a crime event), where many users report the same safety-related information or security event (e.g., a fire) based on the location and/or type of incident. In another instance, the normalizing component 341 may check data by navigating to a third-party network 302 and determine whether the source associated with the data a real person (e.g., access a Facebook® page associated with the data source). Also, the third-party network 302 may be relied upon by the normalizing component 341 to cross-check the content of the data. In a third instance, the normalizing component 341 is equipped to take preventative measures that increase the value of the data being submitted thereto. Examples of a preventative measures include capping the amount of posts allowed per day and resetting login credentials into the front end of the application 345. Both of these measures serve to decrease the amount of hot-generated data.

The normalizing component 341 is further configured for converting and storing the validated safety-related information it acquires. In exemplary embodiments, converting the information into values that are expected by and usable to the generating component 341. In one instance, converting involves parsing the type and description of a crime incident entered by the user device 304 and assigning the crime incident a level of severity. The level of severity may be memorialized as a ranking, index, or other rating system and is employed by the generating component for plotting the crime incident on an overlay. In one example, a mugging would have a higher level-of-severity value than a theft, but a lower level-of-severity value than a homicide. In another instance, converting involves assigning all entered locations a common set of values. In one example, a location entered as a street address or intersection would be converted to a longitude and latitude. Thus, the resultant safety-related information that is eventually stored by the normalizing component 341 is standardized to a common format.

The validated and converted safety-related information is stored by the normalizing component 341 in a data store (not shown). The data store y have any or all the feature of a those known in the art. For instance, the data store may be accessible by other components (e.g., components 342, 343, and 344) internal to the application 345. Also, the data store may have a security mechanism that allows some external entities to access some or all of the safety-related data. For instance, the enterprise system 301 and/or the third-party network 302 may access the data store via an API 360 within the data center 350 or the distributing component 344 of the application 345. In operation, the distributing component 344 is configured to manage subscribers that are approved to access some form of the safety-related information. For example, the distributing component may manage financial transactions with customers that have subscriptions to access the safety-related information at the data store. In one instance, a subscriber may comprise other map-centric apps, such as an online real-estate service (e.g., Zillow®), where the subscriber is enabled either limited access to the data store or the ability to save the safety-related information locally in a data store 303 within their own third-party network 302. In this scenario, the distributing component 344 is not only equipped to share the safety-related information, but to format that information as appropriate for the customer (e.g., creating a histogram of the information to be overlaid on the online real-estate service's maps illustrating the issues within a searched neighborhood))).

With continued reference to FIG. 3, the generating component 343 will now be described. The generating component 343 is configured to access the safety-related information at the data store, upon being processed and saved by the normalizing component 341, and create an overlay that enables a user to visualize the information in an intuitive format. In one instance, creating the overlay involves plotting the individual crime incidents using the standardized location that is assigned therewith. In another instance, creating the overlay involves assigning a shape, a size of the shape, and a color gradient to the shape to the plotted, particular crime incident based on, in part, the level of severity that is associated with that particular crime event. For example, the shape may be a circle, the size may be a radius (e.g., the larger the higher the level of severity), and the color gradient may be a shade of gray (e.g., the darker the higher the level of severity).

Figure 4:
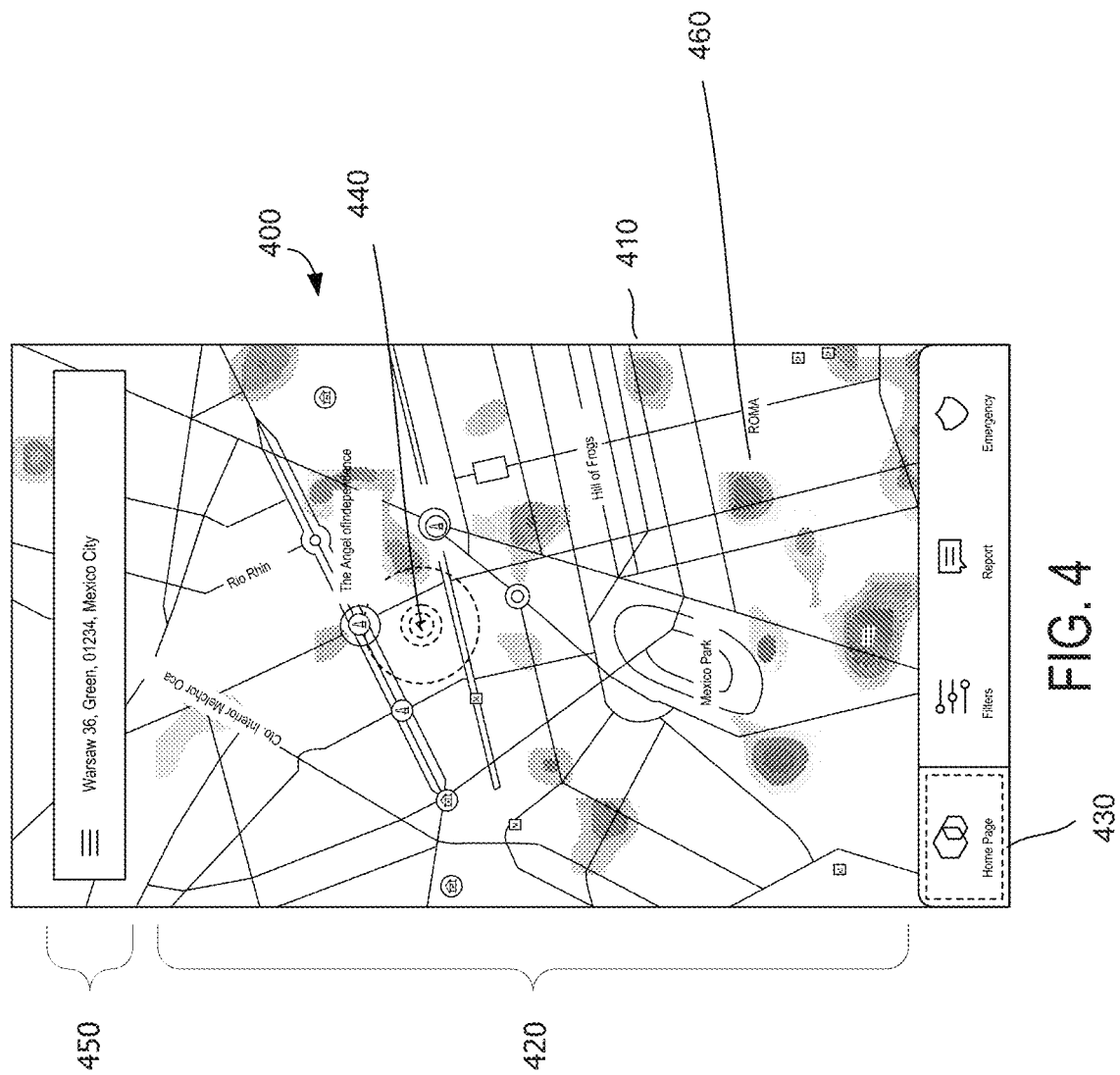
FIG. 4 is a graphical representation of an exemplary graphical user interface (GUI) for displaying a visual representation of safety-related information, in accordance with an embodiment of the present invention.

Turning now to FIG. 4, an exemplary graphical user interface (GUI) 400 for displaying a visual representation 410 of safety-related information is shown, in accordance with an embodiment of the present invention. The visual representation 410 is invoked to be rendered upon a user selecting location 430. Upon being rendered, the visual representation 410 includes a map with an overlay 420 created by the generating component 343 of FIG. 3. The overly 420 corresponds to the map in longitude and latitude, which may be reposition by interaction with a touchscreen, entry of an address in a search bar 450, or any other know means of searching a map. The overlay 420 show both a position of the user 440 and a representation of the safety-related data. Reference numeral 460 identifies a representation of a set of plotted crime events. The representation 460 includes gradients of color (indicating events with differing levels of severity) and a custom shape (indicating events with differing locations). Any schema may be used to by the generating component 343 to draw the shape and to designate the color gradients. In one instance, the generating component 343 is programmed with the schema. The schema may, for example, designate that gradients of color using any combination of number of crime events, frequency of the events, recentness of the events, level of severity associated with the events, and timing of the events. Also, the schema may for example, draw the custom shape based on, in part, overlapping radii of circles assigned to crime incidents that are proximate in location. In another instance, the generating component 343 may access one or more schemas from a heatmap library stored at a remote source.

Figure 5:
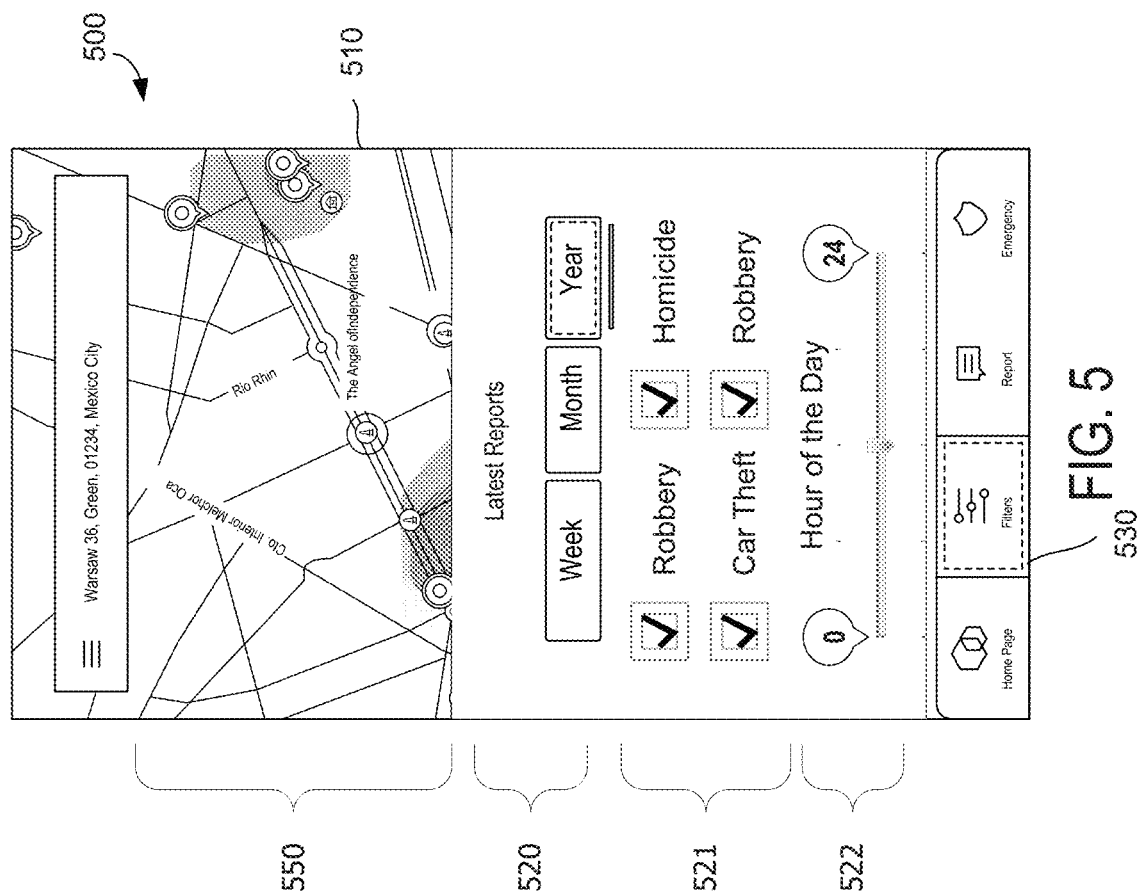
FIG. 5 is a graphical representation of an exemplary graphical user interface (GUI) for allowing a user to adjust controls that affect the timeframe of interest for displaying safety-related information, in accordance with an embodiment of the present invention.

Turning now to FIG. 5, a graphical representation 500 of an exemplary graphical user interface (GUI) 510 for allowing a user to adjust controls that affect the timeframe of interest for displaying safety-related information is shown, in accordance with an embodiment of the present invention. The GUI 510 includes an overlay 550 that shows a visual representation of crime incidents for a given geographic location. As discussed above, when processed as safety related information, the crime incidents are stored in association with a time and date data, respectively. Upon a user selection of location 530, the GUI 510 surfaces a refinement screen 520 that includes controls. User manipulation of the controls allows the user to govern the timeframe of the safety-related information that is displayed on the overlay 520. For example, a user selection of a control labeled "year" allows the user to filter the safety-related information being presented to include only those crime incidents that occurred in the past year for a given location. Alternating between the controls provides the user with ability to identify historical trends. It should be understood that, although time-based controls are shown and described, other controls for filtering the safety-related information being displayed on the overly 550 may be included in the present invention. For instance, embodiments of the invention consider controls that affect the type of crime incidents that are presented (e.g., excluding homicides from being displayed on the overlay 550). Also, it should be understood that automated controls may be applied by the generating component 343 of FIG. 3 filter the safety-related information displayed on the overlay 550. For instance, the generating component 343 of FIG. 3 may filter the safety-related information based on the time of day a user is accessing the GUI 510. In this instance, the overlay will update automatically, adjusting to both the location of the user and the time of day that the user is travelling. For example, the generating component 343 of FIG. 3 may manage display of the safety-related information with a moving-window-of-time filter (e.g., limiting the crime incidents displayed on the overlay 550 to those that occurred two hours before three hours after the criminal incident happened).

Or, in another embodiment, the user may manually adjust the time of day of the crime incidents that the GUI 550 presents. This can be done by adjusting the slider control 522 of FIG. 5. In yet another embodiment, the user may select the type of safety-related information that is presented on the GUI 550. This selection may be performed by checking boxes in the selection control 521. It should be noted that the type of controls and the type of filters that adjust the safety-related information being displayed on the GUI 550 may vary from what is depicted in FIG. 5. For example, a dial control may be featured by the application 345 of FIG. 3 that modulates the events being presented on the GUI 550 between civil disturbances and crime incidents.

Figure 7:
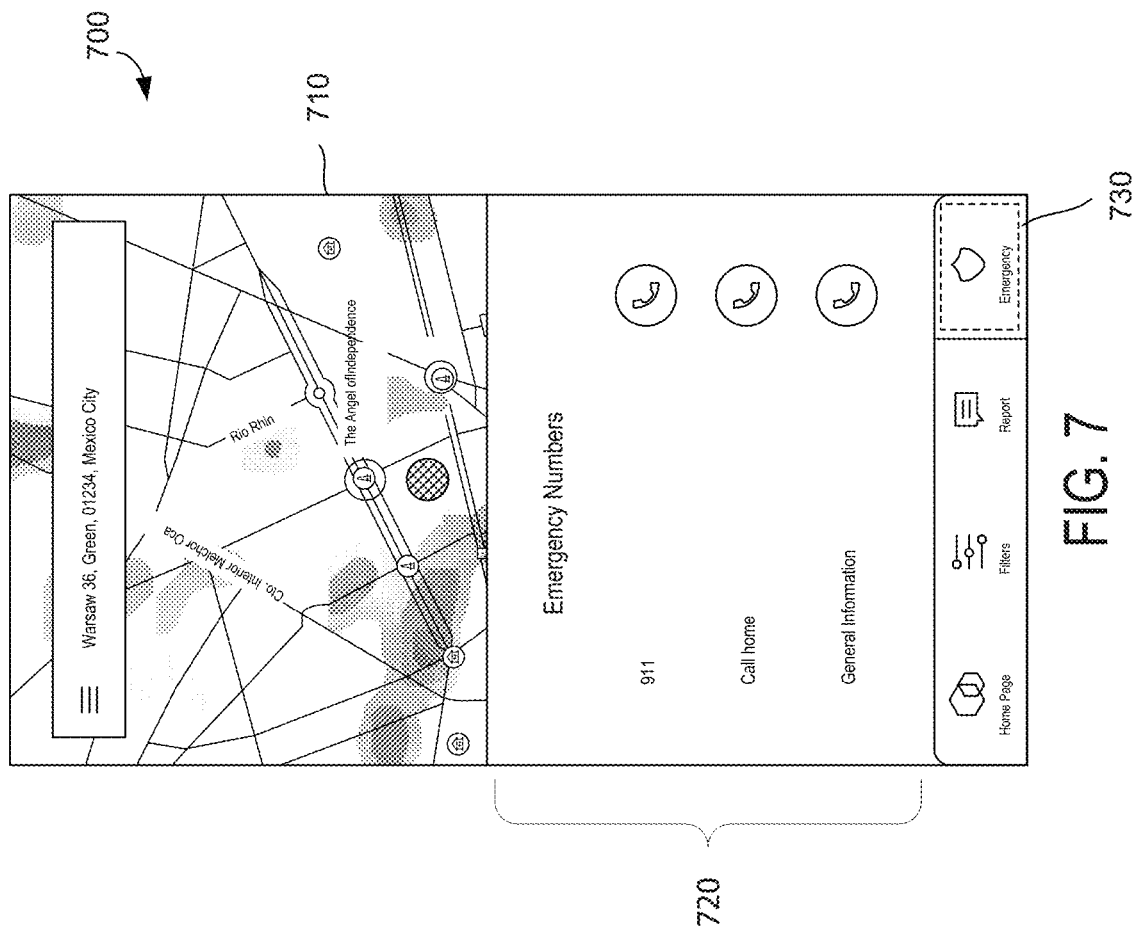
FIG. 7 is a graphical representation of an exemplary graphical user interface (GUI) for reporting e incidents to the authorities via a front end of an application, in accordance with an embodiment of the present invention.

Turning now to FIG. 7, a graphical representation 700 of an exemplary graphical user interface (GUI) 710 for reporting crime incidents to the authorities is shown, accordance with an embodiment of the present invention. In embodiments, the application 345 of FIG. 3 is configured to invoke the GUI 710 to render a contacts screen 720 upon detecting a user-initiated selection of location 730. The contacts screen 730 includes one or more contacts that are relevant to safety upon a user witnessing a crime incident. As shown in FIG. 7, the contacts screen 720 include both predefined contacts (e.g., 911 and general information of the application 345 of FIG. 3) and user-provided contacts (e.g., home). Also, in embodiments, the contacts are presented on the contacts screen 720 in tandem with a shortcut (link to phone number) that assist the user in reaching a particular contact. Selection of a shortcut prompts the user device 304 of FIG. 3 to take an action (e.g., make a call to a specific phone number). It should be noted that any number and type of contacts may be populated on the contacts screen 720. Further, any manner of shortcuts may be presented in tandem with those contacts (e.g., link to a website or prompt to send an email or text).

Figure 8:
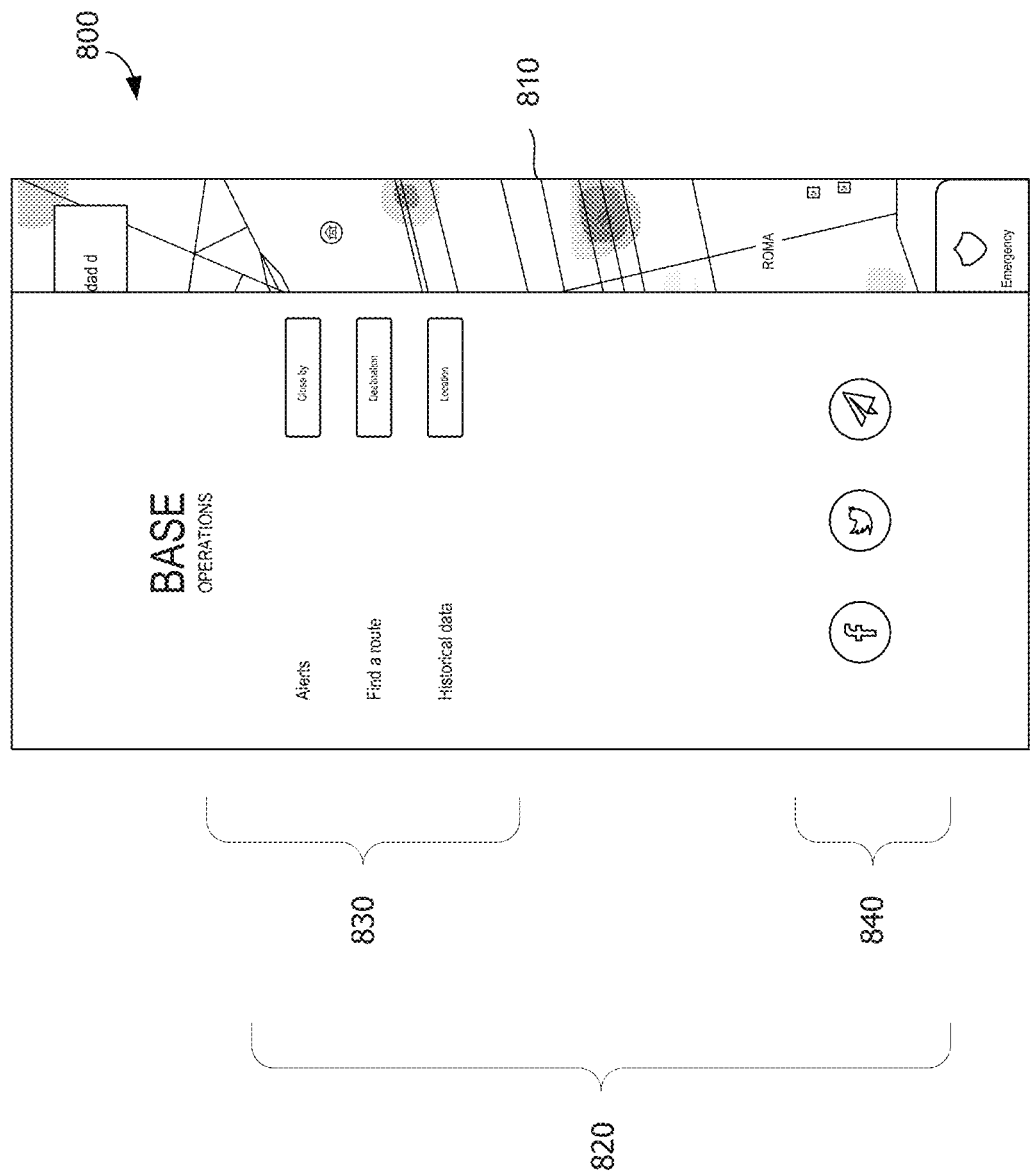
FIG. 8 is a graphical representation of an exemplary graphical user interface (GUI) for selecting one or more actions to take using the safety-related information, in accordance with an embodiment of the present invention.

Turning to FIG. 8, a graphical representation 800 of an exemplary graphical user interface (GUI) 810 for selecting one or more actions to take using the safety-related information is shown, in accordance with an embodiment of the present invention. The GUI 810 shows an action screen 820 that, in embodiments, includes navigation actions 830 and communication actions 840. As shown in the exemplary GUI 810, the communication actions 840 include shortcuts for reporting information. Although the shortcuts depicted within the communication actions 840 include actions for posting to social media (e Facebook® and Twitter®) and for messaging one or more people, embodiments of the invention consider all types of shortcuts for reporting data. For instance, the communication actions 840 may include a shortcut for turning on a camera app or flashlight app of the user's mobile device.

As shown on the action screen 820, the navigation actions 830 include setting and/or configuring alerts, routing, and rendering historical data. In one instance, setting an alert involves specifying individual(s) and/or specifying location (s). An example of specifying individual(s) includes setting up a group of individuals family or friends)) that allows a user to see the location of the individuals within the group on the GUI 810. Further, the user can configure the settings of the group to receive the same alerts that individuals within the group receive. For example, if a child of the user is identified as an individual within a group, the user will receive an alert upon the child walking into an area designated as having high-severity criminal incidents by the application 345 of FIG. 3.

In another instance, setting an alert involves specifying location(s). For example, a user may specify an area of interest (e.g., a radius around the user's home) that triggers an alert when activity is detected therein (e.g., an individual within the specified group walks into the area of interest). The area of interest may be customizable in various ways, such as setting the size and shape around a point on a map. Also, the area of interest may be customized by specifying a type of alert that is associated therewith. For example, the type of alert may be geo-fencing feature that delivers a notification to a user when the user, or a specified individual, is identified as entering a manually specified area of interest (e.g., home) or automatedly specified dangerous area, as determine by the safety-related information collected by the application 345 of FIG. 3. In this example, a GPS feature of the user device 304 may signal a location of the user to the application 345, and the application 345 recognizes that, based on the user's location, the user has travelled within an automatically specified dangerous area. Upon making this notification, the application 345 may invoke a notification (e.g., buzz, vibrate, emit sound, alert others, and so on) at the user device 304. It should be noted that the automatically specified dangerous areas may be customized in various ways. Exemplary ways the automatically specified dangerous areas may be customized include manually varying the type or level of severity of criminal incident(s) that are used to generate the automatically specified dangerous areas (e.g., cab drivers might limit the type of crime incidents to car theft or carjacking) and the type of notification that is delivered to the user.

Retuning to FIG. 8, in embodiments, the navigation action 830 of routing involves instructing the routing component 342 of FIG. 3 to generate a route between two points on a map. These points on the map may include location of origination (starting point) and a location of destination (ending point), but aren't limited to just two points. In other embodiments, these points may be entered manually (e.g., using a navigation bar) and/or provided automatically (e.g., using a GPS feature). Once the points are received at the routing component 342, a route is generated that avoids dangerous areas, as recognized by the routing component using the safety-related information. This route is subsequently presented to the user on the GUI 810 in any graphical form know in the art.

The historical data control of the navigation actions 830 allows a user to view a representation of one or more analytics performed by the application 345 of FIG. 3. These analytics may include the production of a weekly or monthly report, the presentation of a histogram of a selection of safety-related data, the surfacing of metadata associated with crime incidents plotted on the GUI 810, and so on. In one embodiment, surfacing the metadata involves a visual portrayal of details associated with one or more crime incidents type of crime, level of severity, and date/time).

Turning to FIG. 3, another embodiment of routing using the safety-related information will now be described. As discussed above, a third-party network 302 may access the safety-related information for use in a map-centric app Waze®). Typically, map-centric applications are designed to route travelers to their destination location optimizing only for time. Integration of the safety-related information with traffic-related information (e.g., stored at the data store 303) used by the map-centric app allows for adjusting the route to consider safety of the traveler. This integration serves to increase security within the routing. The amount of security increase may be based on user-specified weightings. For example, a user may meter the affect security and/or timeless should have upon a route. In this example, the metering assigns one weighting to the safety-related information and a second weighting to the traffic-related information. In operation, when the map-centric application is generating a route, consideration to the weightings and their associated information is given. In effect, this act of metering adjusts the route based on a user's sensitivity to security (e.g., high sensitivity generates a route that avoids all areas with criminal incidents while a medium sensitivity generates a faster route that potentially directs the user to take streets in low sensitivity level areas). It should be understood that any type of routing algorithm may be used by the map-centric app. One exemplary routing algorithm stops taking into account streets identified as existing in dangerous areas as the user meters the level of safety higher.

It should be noted that the application 345 may comprise a single software component or may be partitioned into a plurality of distinct software components, such as components 341, 342, 343, and 344 that interact with each other to carry out the processes for plotting and routing based on crime-related data. Any number of components may be used to carry out the functionality described above. Also, at least one of the components 341, 342, 343, and 344 may reside in full or in part in one or more different locations other than shown.

Turning now to the enterprise system 301 of FIG. 3, a method that creates a map of dangerous areas overlaid with locations of company employees will now be described in accordance with embodiments of the present invention. The enterprise system includes a communication component 315, a merging component 320, a warning mechanism 325, a notification component 330, and an employee portal 335 that is configured to communicate with one or more employee devices (e.g., user device 304). The communication component 315 is configured to access an overlay of a map (e.g., created by the generating component 343), where the overlay visually represents an event location of at least one crime incident. The employee portal 335 is configured to receive the locations of the company employees. The merging component 320 is configured to generate a graphical user interface (GUI) of the map that indicates the locations of the company employees and the event location of the crime incident(s). The notification component 330 is enabled to surface the GUI on devices accessible by a use company employee), while the warning mechanism 325 is configured provide data one or more individuals with an administrative account.

Figure 9:
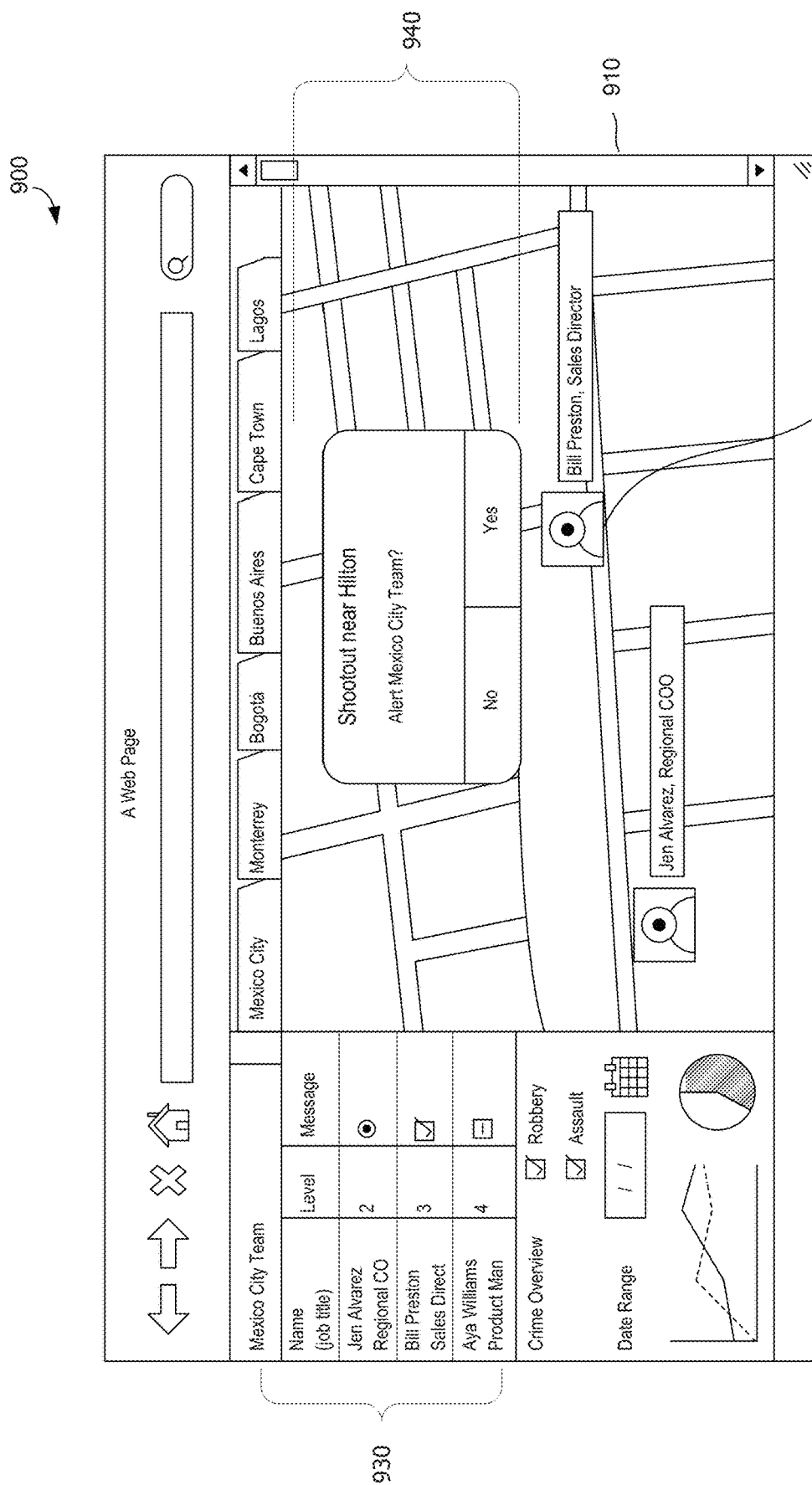
FIG. 9 is a graphical representation of an exemplary graphical user interface (GUI) for surfacing safety-related information to an administrator of an enterprise, in accordance with an embodiment of the present invention.

Turning to FIG. 9, a graphical representation 900 of an exemplary graphical user interface (GUI) 910 for surfacing safety-related information to an administrator of a private enterprise is shown, in accordance with an embodiment of the present invention. In embodiments, the notification component 330 of FIG. 3 is configured to generate the GUI 910. As depicted, the GUI 910 includes a listing 930 of employees of the private enterprise along with pertinent information about those employees, a location 920 of one or more employees from the listing 930, and a pop-up notification 940. The notification 940, in embodiments, is surfaced upon one or more predefined events occurring, such as a crime incident being reported as happening within a set proximity to one or more employees. The notification 940 allows the administrator to interaction with one or more of the employees upon interacting with selectable buttons on the notification 940.

Figure 10:
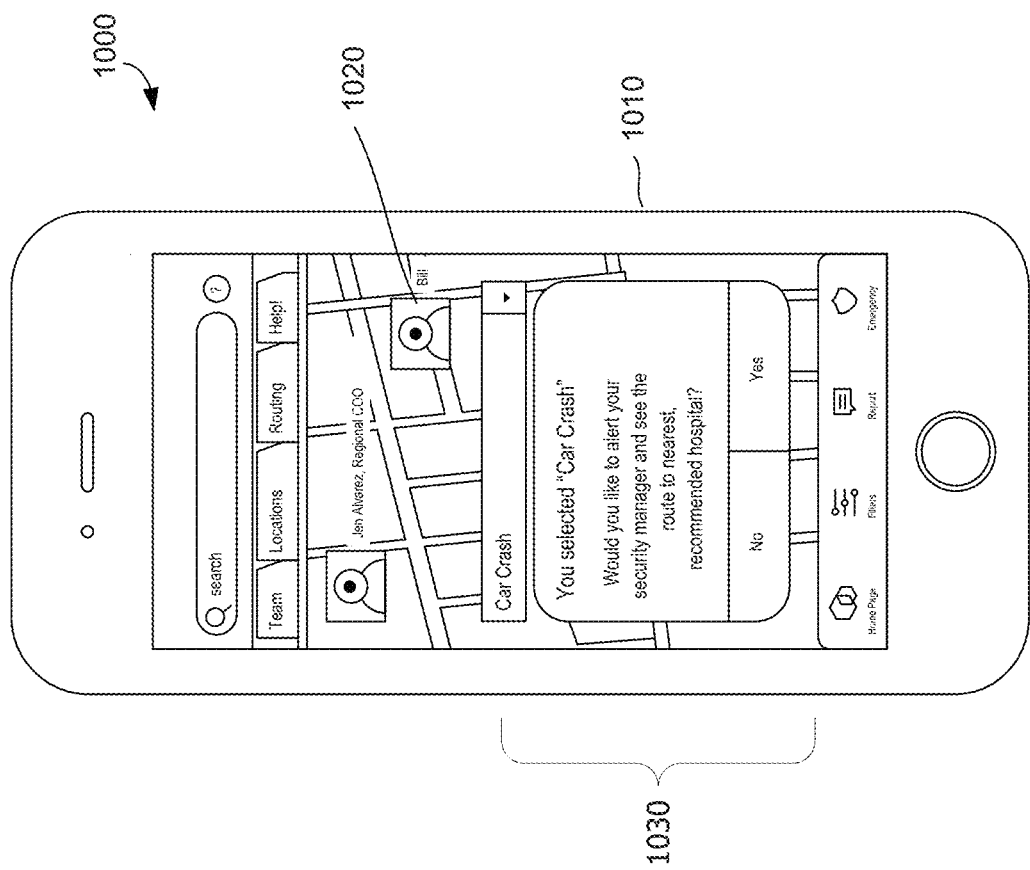
FIG. 10 is a graphical representation of an exemplary graphical user interface (GUI) for surfacing safety-related information to an employee of an enterprise, in accordance with an embodiment of the present invention.

FIG. 10 shows a graphical representation 1000 of an exemplary graphical user interface (GUI) 1010 for surfacing safety-related information to an employee of a private enterprise, in accordance with an embodiment of the present invention. In embodiments, the warning mechanism 325 of FIG. 3 is configured to generate the GUI 1010. The GUI 1010 includes a location of the employee of the private enterprise and, perhaps, one or more other employees that are in the vicinity and a pop-up notification 1030. The notification 1030, in one embodiment, is surfaced upon one or more predefined events occurring, such as an administrator alerting the employee of a crime incident. In another embodiment, the notification 1030 allows the employee to interaction with one or more administrators upon interacting with selectable buttons on the notification 1030.

In other embodiments of the present invention, security managers of an enterprise are enabled to input their own rankings and preferences for emergency plans. For example, the security managers may have approved a certain hospital in Mexico City for some employees (e.g., sales representatives) and prohibited other employees (e.g., executive level personnel and above) from being transported there. In this embodiment, the security managers may set these and other preferences using their console, and the appropriate information (based on these setting) is pushed to the employee's app. As an example, if an employee is assaulted, the app will route that employee to the approved hospital via the safest route in accordance with the settings.

Process Flows

Exemplary methods for discovering anomalies are described with reference to FIGS. 11 and 12. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations.

Turning to FIG. 11, a flow diagram showing an overall method 1100 for identifying a secure route between two points is shown, in accordance with an embodiment of the present invention. It should be noted that, although the terms "step" and/or "block" may be used herein to connote different elements of methods employed, the terms should not be interpreted as implying any particular order among or between various steps herein disclosed unless and except when the order of individual steps is explicitly described.

Initially, the method 1100 involves accessing safety-related information from a data store, as indicated at block 1105. The safety-related information is, for example, compiled from at least one crime incident being reported from a reliable source (e.g., government or public data store). Generally, the crime incident includes an event location and a level of severity. As indicated at block 1110, a graphical user interface (GUI) is generated that includes an overlay of a map. In embodiments, the overlay visually represents the crime incident(s) in a graphical depiction as a shape, where the size of the shape is associated with the level of severity and a position of the shape is associated with the event location.

The method 1100 additionally involves receiving from a user of a computing device (e.g., mobile device, smart phone, handset, and the like) a destination location (e.g., manually input into the computing device using a touchscreen) and receiving an origination location of the computing device (e.g., automatically identified using a GPS feature of the computing device). A route is then generated from the origination location to the destination location using, in part, the safety-related information, as indicated at block 1115. In embodiments, the route may be layered or merged with the overlay to create a robust visual description of how the route avoids certain crime incidents that are plotted on a map. As indicated at block 1120 the computing device is invoked to present the route, overlay, or merger of the two on top of a map, or integrated with the map.

Turning to FIG. 12, a flow diagram showing an overall method 1200 for using safety-related information and traffic-related information to generate a route on a map is shown, in accordance with an embodiment of the present invention. Initially, the method 1200 involves accessing safety-related information from an application programming interface (API), as indicated at block 1205. As explained above in greater detail, the safety-related information includes crime incidents that are respectively associated with an event location and a level of severity. As indicated at block 1210, traffic-related information is accessed from a data store. As used herein, the phrase "traffic-related information" is not meant to be limiting and may encompass all types of events that would influence movement of traffic including auto-accident data, street-construction data, street-closure data, weather-interference data, and/or stalled-car data.

The method 1200 further includes the step of reading from a data location a first weighting and a second weighting, as indicated at block 1215. In one embodiment, the first weighting corresponds with the safety-related information and the second weighting corresponds with the traffic-related information. As indicated at block 1220, an origination location and a destination location are received (e.g., from a user of a mobile device or a customer of a service provider), where the origination location and the destination location represent a first point and a second point on a map. As indicated at block 1225, a route between the origination location and the destination location is generated using the safety-relation information and the traffic-related information. In one instance, generating the route involves creating a plotted course on the map as a function of the first weighting applied to the safety-related information and the second weighting applied to the traffic-related information. A visual representation of the route on the map is distributed to one or more user devices. One of these user devices may have provided the origination location and/or the destination location.

Any of the acts of any of the methods 1100 and 1200 described herein may be implemented at least partially by a processor or other electronic device based on instructions stored on one or more computer-readable media.

Although the invention has been described in language specific to structural features and/or methodological acts, it is to be understood that the invention is not necessarily limited to the specific features or acts described. Rather, the specific features and acts are disclosed as exemplary forms of implementing the invention. That is, embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more non-transitory computer storage media having computer-executable instructions embodied thereon that, when executed by a processing device; configure the processing device to:
   receive at least one user-defined group including at least a first individual and a second individual, the user-defined group created by the first individual;
   receive at least one user-defined safety priority for each of the first individual and the second individual, each user-defined safety priority being selected by the first individual, the safety priority including a first severity level threshold associated with the first individual and a second severity threshold level associated with the second individual, the first severity level threshold being different than the second severity threshold level;
   receive at least one user-defined area of interest associated with the first individual or associated with the second individual;
   receive safety-related information associated with an event, the first individual, or the second individual, the safety-related information including an event location and a level of severity associated with the event;
   generate a graphical user interface (GUI) that includes a map, at least a portion of the map visually representing the at least one event as a shape, a size of the shape associated with the level of severity and a position of the shape associated with the event location;
   generate a first alert based on the first individual entering the area of interest or entering the event location and the level of severity associated with the event exceeding the first severity level threshold; and
   generate a second alert based on the second individual entering the area of interest or entering the event location and the level of severity associated with the event exceeding the second severity level threshold.

2. The one or more non-transitory computer storage media of claim 1, wherein the first individual is associated with the processing device and the second individual is unassociated with the processing device.

3. The one or more non-transitory computer storage media of claim 1, wherein the at least one user-defined group includes at least the first individual, the second individual and a third individual who is not the first individual or the second individual.

4. The one or more non-transitory computer storage media of claim 3, wherein generating the alert is based on the at least one individual selected from the group consisting of the first individual, the second individual, and the third individual either entering the area of interest or entering the event location and the level of severity associated with the event exceeding the severity level threshold associated with the at least one individual.

5. A system comprising at least one processor and memory storing non-transitory computer-readable instruction thereon that, based on execution by the at least one processor, configure the at least one processor to:
   receive at least one user-defined group including at least a first individual and a second individual, the user-defined group created by the first individual;
   receive at least one user-defined safety priority for each of the first individual and the second individual, each user-defined safety priority being selected by the first individual, the safety priority including a first severity level threshold associated with the first individual and a second severity threshold level associated with the second individual, the first severity level threshold being different than the second severity threshold level;
   receive at least one user-defined area of interest associated with the first individual or associated with the second individual;
   receive safety-related information associated with an event, the first individual or the second individual, the safety-related information including an event location and a level of severity associated with the event;
   generate a graphical user interface (GUI) that includes a map, at least a portion of the map visually representing the at least one event as a shape, the size of the shape associated with the level of severity and a position of the shape associated with the event location;
   generate a first alert based on the first individual entering the area of interest or entering the event location and the level of severity associated with the event exceeding the first severity level threshold; and
   generate a second alert based on the second individual entering the area of interest or entering the event location and the level of severity associated with the event exceeding the second severity level threshold.

6. The system of claim 5, wherein the at least one user-defined group includes at a third individual who is not the first individual or the second individual.

7. The system of claim 6, wherein generating the alert is based on the at least one individual selected from the group consisting of the first individual, the second individual, and the third individual, either entering the area of interest or entering the event location and the level of severity associated with the event exceeding the severity level threshold associated with the at least one individual.

\* \* \* \* \*